(12) United States Patent
Pitti

(10) Patent No.: US 11,048,813 B2
(45) Date of Patent: Jun. 29, 2021

(54) METHOD AND SYSTEM FOR MANAGING CONSENT DATA IN A BLOCKCHAIN NETWORK

(71) Applicant: NUCLEUS VISION, LLC, Grand Cayman (CI)

(72) Inventor: Abhishek Pitti, Attapur (IN)

(*) Notice: Subject to any disclaimer, the term of this patent is extended or adjusted under 35 U.S.C. 154(b) by 92 days.

(21) Appl. No.: 16/556,031

(22) Filed: Aug. 29, 2019

(65) Prior Publication Data

US 2020/0074102 A1 Mar. 5, 2020

Related U.S. Application Data

(60) Provisional application No. 62/749,615, filed on Oct. 23, 2018.

(51) Int. Cl.
| | |
|---|---|
| G06F 21/62 | (2013.01) |
| G06F 16/23 | (2019.01) |
| G06F 21/60 | (2013.01) |
| H04L 9/06 | (2006.01) |

(52) U.S. Cl.
CPC ...... *G06F 21/6218* (2013.01); *G06F 16/2379* (2019.01); *G06F 21/602* (2013.01); *H04L 9/0637* (2013.01); *H04L 2209/38* (2013.01)

(58) Field of Classification Search
CPC .............. G06F 21/6218; G06F 21/602; G06F 16/2379; H04L 9/0637
USPC .......................................................... 713/193
See application file for complete search history.

(56) References Cited

U.S. PATENT DOCUMENTS

| | | | |
|---|---|---|---|
| 2015/0059003 A1* | 2/2015 | Bouse .................. | H04L 63/102 726/28 |
| 2018/0225661 A1* | 8/2018 | Russinovich .......... | G06F 21/57 |
| 2019/0306128 A1* | 10/2019 | Kothavale .............. | H04L 63/10 |
| 2020/0167501 A1* | 5/2020 | Brannon ............ | G06Q 10/0631 |

* cited by examiner

*Primary Examiner* — Dant B Shaifer Harriman
(74) *Attorney, Agent, or Firm* — Leavitt Eldredge Law Firm; Richard Eldredge; Brandon Leavitt

(57) ABSTRACT

The present invention is a system and method for managing consent data in a blockchain network. The method includes the step of storing identification data, digital interactions data, and physical interactions data of a user in a storage module. The method then includes the step of facilitating the user to provide permission for sharing the identification data, digital interactions data, and physical interactions data through a consent module. The method includes the step of receiving a request command from data users to access the consent data of the user through a request module. The permission of the user indicates a first transaction on a private chain of the blockchain network. The method includes the step of triggering the blockchain network to enable the data users to access the consent data through an access module.

12 Claims, 4 Drawing Sheets

METHOD AND SYSTEM FOR MANAGING CONSENT DATA IN A BLOCKCHAIN NETWORK

BACKGROUND

1. Field of the Invention

The present invention relates a to system and method for managing consent data in a blockchain network, and in particular to a system and method for using cryptographic mechanisms, peer-to-peer protocols, and distributed ledgers to protect and share consent data of the users.

2. Description of Related Art

Generally, enterprises (e.g., government agencies, healthcare institutions, financial institutions, retailers, online service providers, employers, etc.) collect, store and maintain personal data of their customers (e.g., employee, consumer, users, etc.) in exchange of their products and services.

The system and methods used by these enterprises provide a centralized database to store the consent data of the customers which are susceptible to hacking and other fraudulent activities. Further, the owners of the centralized database may share the consent data of the customer without the knowledge of the customer for various political and business motives. Furthermore, the existing systems and methods do not provide complete control to the customers to manage their consent data. As can be appreciated, most customers and individuals desire to manage and control their own consent data.

Therefore there is a need for a secure, decentralized, and efficient system and method to collect, validate, store, share, and modify the consent data of the customers. Further, there is a need for a system and method to use a blockchain network to enable each customer to control their consent data and record the transaction each time the customer permits the consent data to be used. Such as system and method places control back in the customers possession, while using the security and management capabilities of blockchain technology.

SUMMARY

The present invention mainly solves the technical problems existing in the prior art in response to these problems, the present invention provides a system and method for managing consent data in a blockchain network.

An aspect of the present disclosure relates to a method for managing consent data in a blockchain network. The method includes the step of storing at least one of identification data, digital interactions data, and physical interactions data of a user received from a computing device of the user, and a plurality of data providers in a storage module configured with the blockchain network. The method then includes the step of the user providing permission for sharing the identification data, digital interactions data, and physical interactions data through a consent module. The consent module renders consent data on receiving the permission of the user and the storage module stores the consent data. The consent data is encrypted and comprises a digital object. In the preferred embodiment, the digital object comprises a plurality of identification attributes associated with an identity of the user in a cyber system and establishes the identity of the user. The method further includes the step of receiving a request command from one or more data users to access the consent data of the user through a request module. The permission of the user indicates the first transaction on a private chain of the blockchain network. The method further includes the step of triggering the blockchain network to enable the data users to access the consent data through an access module. The method further includes the step of displaying the first transaction, and the consent data to the user and the data provider through a visual module. The method further includes the step of allowing the user to modify the data corresponding to the user by possessing a private key necessary to modify the data through a modification module. The method further includes the step of triggering a second transaction on a public chain of the blockchain network to provide an incentive through an incentive module.

In an aspect, the access module is configured to evaluate the request command of the data users based on a plurality of predefined parameters to then facilitate the user to access the consent data.

In an aspect, the predefined parameters comprise a due diligence operation which can be performed on the data users and the request command to access the consent data by the data provider.

In an aspect, the access module is configured to enable the data users to access the consent data of the user after mapping the request with the corresponding user.

In an aspect, the incentive module detects the sharing of the consent data over the blockchain network and records the latest transaction involving one or more concerned parties selected from at least one of the user, the data provider, and the data user.

In an aspect, the data providers and Blockchain network may store various data parameters pertaining to the users such as name, age, gender, address, date of birth, likes, purchase history, etc. The data parameters may include other personal information of the user which is stored in the memory of the present system and databases of the data providers such as banks, telecom provider. The data providers need to be registered with the present system.

Another aspect of the present invention relates to the system for managing consent data in a blockchain network. The system includes a processor and a memory communicatively coupled to the processor. The memory stores instructions configured to be executed by the processor, wherein the processor then stores at least one of identification data, digital interactions data, and physical interactions data of a user received from a computing device of the user, and a plurality of data providers in a storage module configured with the blockchain network. The processor is then configured to facilitate the user to provide permission for sharing the identification data, digital interactions data, and physical interactions data through a consent module. The consent module renders a consent data on receiving the permission of the user and the storage module stores the consent data. The consent data is encrypted and comprises a digital object. The digital object includes a plurality of identification attributes associated with an Identity of the user in a cyber system and establishes the identity of the user. Further, the processor is configured to receive a request command from one or more data users to access the consent data of the user through a request module. The permission of the user indicates the first transaction on a private chain of the blockchain network. The processor is configured to trigger the blockchain network to enable the data users to access the consent data through an access module. The processor is configured to display the first transaction, and the consent data to the user and the data provider through a visual module. The processor is configured to allow the user to modify the data corresponding to the user by possessing a private key necessary to modify the data through a modification module. The processor is configured to trigger a second transaction on a public chain of the blockchain network to provide an incentive through an incentive module.

Accordingly, one advantage of the present Invention is that it uses cryptographic mechanisms, peer-to-peer protocols, and distributed ledgers to collect, validate, store, share, and modify the consent data of the customers. This feature combination of features provides for placing control and security back in the user's hands.

Accordingly, one advantage of the present invention is that ii uses the blockchain network to enable each customer to control their consent data and record the transaction each time the customer permits the consent data to be used.

Accordingly, one advantage of the present invention is that the blockchain network is implemented by a data exchange platform to provide insightful data related to the user to the data user.

Accordingly, one advantage of the present invention is that it provides transparency to the entire process of receiving, storing and sharing of the consent data.

Accordingly, one advantage of the present invention is that it stores the consent data in a decentralized storage module to prevent the consent data from any breach and hinders any one party from monopolizing by using the consent data without the knowledge of the customer.

Accordingly, one advantage of the present invention is that it enables the customers to revoke their consent data.

Other features of embodiments of the present invention will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, ail without departing from the invention. Accordingly, the drawings and description thereof are to be regarded as illustrative in nature, and not as restrictive.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein;

Figure 1:
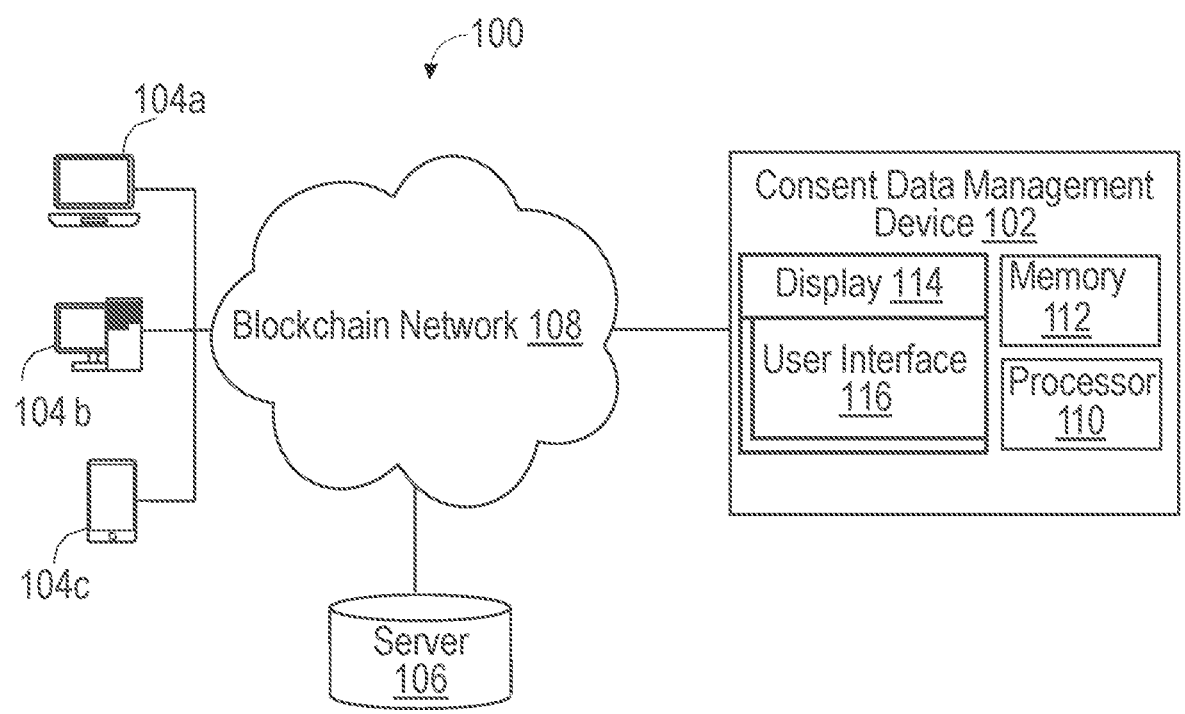
FIG. 1 illustrates a network implementation of the present system for managing consent data in a blockchain network, in accordance with an embodiment of the present subject matter.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not ail variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Systems and methods are disclosed for using cryptographic mechanisms, peer-to-peer protocols, and distributed ledgers to protect and share consent data of a plurality of customers. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

The present invention discloses a system and method whereby the consent data of the customer can be stored and shared over a blockchain network. Every customer, as well as data providers will be part of a private chain Access to the private chain is provided after following the due diligence for the data providers and the required information from the customers. The consent transactions (permissions from the customers) are part of the private blockchain. Every consent request raised by a data user (retailer) shall be directed to the customer mapped to the private chain. The consent of the customer is a transaction on the public chain and stored permanently in the storage module. The customer and data provider can see the consent transaction and its data (data parameters, retailer, and status). Further, the customer can modify the consent data at any time. The data sharing process shall always look for the latest transaction involving the concerned parties. Each time the data sharing is happening, a transaction is triggered on a public blockchain to assist the incentive.

Although the present disclosure has been described with the purpose of managing consent data in a blockchain network, it should be appreciated that the same has been done merely to illustrate the invention in an exemplary manner and any other purpose or function for which explained structures or configurations could be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention Those of ordinary skill in the art further understand that the exemplary hardware, software, processes, methods, and/or operating systems described herein are for illustrative purposes and, thus, are not intended to be limited to any particular name.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail, in other instances, well-known circuits, processes, algorithms, structures, and techniques may be shown without unnecessary detail to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory or memory devices.

FIG. 1 illustrates a network implementation of the present system 100 for managing consent data in a blockchain network 108, in accordance with an embodiment of the present subject matter. The system includes a consent data management, device 102 that is configured to automatically manages consent data in a blockchain network 108. In particular, a storage module is configured with the blockchain network to store at least one of identification data, digital interactions data, and physical interactions data of a user received from a computing device of the user, and a plurality of data providers. Examples of the user can include but are not limited to a customer, a data owner, a consumer, etc. Examples of the data provider include but not limited to a data aggregator, a product provider, service providers, etc.

The consent module of the present invention is configured to facilitate the user to provide permission for sharing the identification data, digital interactions data, and physical interactions data. The consent module further renders a consent data on receiving the permission of the user and the storage module stores the consent data. The consent data is encrypted and comprises a digital object. The digital object comprises a plurality of identification attributes associated with an identity of the user in a cyber system and therefore is configured to establish the identity of the user. Request module receives a request command from one or more data users to access the consent data of the user. Examples of the data users include but are not limited to a data requester, a retailer, a merchant, etc.

The permission of the user indicates the first transaction on a private chain of the blockchain network. An access module is configured to trigger the blockchain network to enable the data users to access the consent data. A visual module is configured to display the first transaction and the consent data to the user and the data provider. A modification module allows the user to modify the data corresponding to the user by possessing a private key necessary to modify the data.

In the present invention, an incentive module triggers a second transaction on a public chain of the blockchain network to provide an incentive. In an embodiment the incentive is allocated by the data user which is distributed among the data providers and the users (customers). The blockchain network 108 may determine a certain percentage of the incentive based on the type of consent data or the transaction which need to be paid to the data providers and the users or customers by the data user. The incentive may be in the form of fiat currency (coins, paper notes, etc.).

In an embodiment, a transaction of the consent data or a monetary transaction among parties such as users, data providers, and data users are captured. AH financial transactions/incentives are captured on the blockchain network with the parties involved along with the timestamp and the location. One of the unique features believed characteristic of the present invention is that the user can control the sharing of the consent data and the sharing is limited to the user authorizing to the data provider or retailer. Once the user gives consent to share his/her data, he/she will be incentivized with loyalty points. If there is a data partner involved for sharing data, there will be an incentive from the data provider to the data partner if the user gives the consent on sharing data and this consent is recorded on the blockchain network.

In an embodiment, the present system may use one or more classification models with recommendation forecasting, neural networks, deep learning for managing the consent data One or more machine learning modules may identify the pattern in the consent data provided by the users to enable the present system to personalize the user's behavior to serve in an efficient manner.

The consent data may be presented to the user by a plurality of computing devices 104 (for example, a laptop 104a, a desktop 104b, and a smartphone 104c). The consent data may be stored within a plurality of computing devices 104. Other examples of a plurality of computing devices 104, may include but are not limited to a phablet and a tablet. Alternatively, the consent data may be stored on a server 106 and may be accessed by a plurality of computing devices 104 via the blockchain network 108. In one implementation, the blockchain network 106 may be a wireless network, a wired network or a combination thereof. The blockchain network 106 can be implemented as one of the different types of networks, such as a distributed ledger, and the like.

The blockchain network 106 may either be a dedicated network or a shared network. The shared network represents an association of the different types of networks that use a variety of protocols for example, consensus protocols (proof of work protocol, proof of stake protocol, delegated byzantine fault tolerance (dBFT) protocol, DPOS or delegated proof of stake protocol, Hypertext Transfer Protocol (HTTP), Transmission Control Protocol/Internet Protocol (TCP/IP), Wireless Application Protocol (WAP), and the like, to communicate with one another. Further, the blockchain network 106 may include a variety of network devices, including routers, bridges, servers, computing devices, storage devices, and the like.

The blockchain network 106 may include a plurality of blocks, where each block may include a plurality of transactions In one embodiment, the plurality of transactions may be requested, for example, chronologically. Additionally, or alternatively, the plurality of blocks may be requested, where each newly added block may be linked to a latest previously block.

In one embodiment, such a blockchain network 106 may be tamper-resistant, and may, therefore, be used to confirm whether a given transaction did take place, and/or when the transaction took place. For instance, a block may be added to the blockchain only if ail nodes (or a subset of nodes with sufficient computation power) in the blockchain network 106 implementing the blockchain agree on the block. Furthermore it should be appreciated that any suitable blockchain implementation may be used to provide a trust layer, including, but not limited to. Ethereum and Hyperiedger Fabric.

When a user of laptop 104a, for example, wants to visualize consent data, the laptop 104a communicates the same with consent data management device 102, via blockchain network 108. The consent data management device 102 then presents the consent data as per the data user's request. To this end, consent data management device 102 includes a processor 110 that is communicatively coupled to a memory 112, which may be a non-volatile memory or a volatile memory. Examples of non-volatile memory may include, but are not limited to flash memory, a Read Only Memory (ROM), a Programmable ROM (PROM), Erasable PROM (EPROM), and Electrically EPROM (EEPROM) memory. Examples of volatile memory may include but are not limited Dynamic Random Access Memory (DRAM), and Static Random-Access memory (SRAM).

Processor 110 may include at least one data processor for executing program components for executing user- or system-generated requests. A user may include a person, a person using a device such as those included in this invention, or such a device itself. Processor 110 may include specialized processing units such as integrated system (bus) controllers, memory management control units, floating point units, graphics processing units, digital signal processing units, etc.

Processor 110 may include a microprocessor, such as AMD® ATHLON® microprocessor, DURON® microprocessor OR OPTERON® microprocessor, ARM's application, embedded or secure processors, IBM® POWERPC®. INTEL'S CORE® processor, ITANIUM® processor, XEON® processor. CELERON® processor or other line of processors, etc. Processor 110 may be implemented using mainframe, distributed processor, multi-core, parallel, grid, or other architectures Some embodiments may utilize embedded technologies like application-specific integrated circuits (ASICs), digital signal processors (DSPs), Field Programmable Gate Arrays (FPGAs), etc.

Processor 110 may be disposed of in communication with one or more input/output (I/O) devices via an I/O interface. I/O interface may employ communication protocols/methods such as, without limitation, audio, analog, digital, RCA, stereo, IEEE-1394, serial bus, universal serial bus (USB), infrared, PS/2, BNC, coaxial, component, composite, digital visual interface (DVI), high-definition multimedia interface (HDMI). RF antennas. S-Video, VGA, IEEE 802 n/b/g/n/x, Bluetooth, cellular (e.g., code-division multiple access (CDMA), high-speed packet access (HSPA+), global system for mobile communications (GSM), long-term evolution (LTE), WiMax, or the like), etc.

In some embodiments, memory 112 further includes various modules that enable the consent data management device 102 to automatically manage consent data in the blockchain network. These modules are explained in detail in conjunction with FIG. 2. Consent data management device 102 may further include a display 114 having a User Interface (UI) 116 that may be used by a data user to initiate a request to view consent data of the user. Display 114 may further be used to display consent data. The functionality of the consent data management device 102 may alternatively be configured within each of plurality of computing devices 104.

In operation, the consent data management device 102 is integrated with the terms and conditions (T&C) of various partner services (e.g., Telecom loyalty program, retailer loyalty program, mobile wallet applications, cab aggregator applications or any third-party software applications). Once the consent data management device 102 receives the consent from the customer on T&C, the consent data is stored over the blockchain network 108 as transactions. In an embodiment, the customer can access his/her consent data by using any front-end software applications by providing the private authentication key. This mechanism provides the customer with transparency to access their consent details (e.g., type of consent, the services the consent was given to, etc.) anytime and have full control over their consent data. The customer will be the sole owner of their data over blockchain network 108 and can select who gets access at each step. This feature is believed novel over the prior art.

Figure 2:
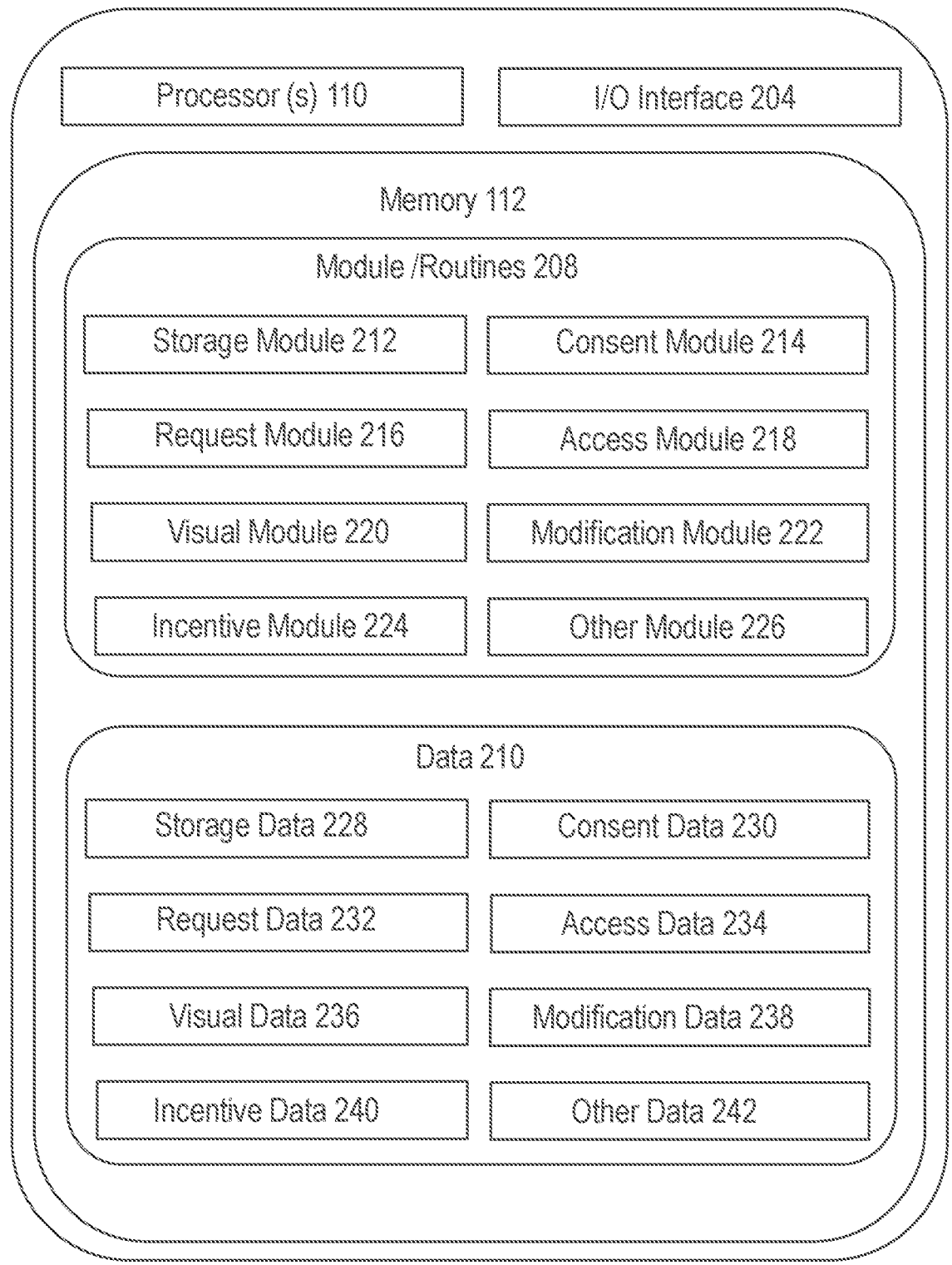
FIG. 2 illustrates the present system to manage consent data in a blockchain network, in accordance with an embodiment of the present subject matter.

FIG. 2 illustrates the present system configured to manage consent data in a blockchain network, in accordance with an embodiment of the present subject matter. FIG. 2 is explained in conjunction with FIG. 1. The system may include at least one processor 110, an input/output (I/O) interface 204, and a memory 112. The processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 112.

The I/O interface 204 may include a variety of software and hardware interfaces, for example, a web interface, a graphical user interface, and the like. The I/O interface 204 may allow the system to interact with a user directly or through the computing device 104. Further, the I/O interface 204 may enable the system to communicate with other computing devices, such as web servers and external data servers (not shown). The I/O interface 204 can facilitate multiple communications within a wide variety of networks and protocol types, including wired networks, for example, LAN, cable, etc. and wireless networks, such as WLAN cellular, or satellite. The I/O interface 204 may include one or more ports for connecting a number of devices to one another or to another server.

The memory 112 may include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 112 may include modules 208 and data 210.

The modules 208 include routines, programs, objects, components, data structures, etc., which perform particular tasks or implement particular abstract data types. In one implementation, the modules 208 may include a storage module 212, a consent module 214, a request module 216, an access module 218, a visual module 220, a modification module 222, an incentive module 224, and other module 226. The other modules 226 may include programs or coded instructions that supplement applications and functions of the system.

The data 210, amongst other things, serves as a repository for storing data processed, received, and generated by one or more of the modules 208. The data 210 may also include storage data 228, consent data 230, request data 232, access data 234, visual data 236: modification data 238, an incentive data 240 and other data 242. The other data 242 may include data generated as a result of the execution of one or more modules in the other module 226.

In one implementation, the storage module 212 is configured with the blockchain network to store at least one of identification data, digital Interactions data, and physical interactions data of a user received from a computing device of the user, and a plurality of data providers.

Consent module 214 facilitates the user to provide permission for sharing the identification data, digital interactions data, and physical interactions data. The consent module renders a consent data on receiving the permission of the user and the storage module stores the consent data. The consent data is encrypted and comprises a digital object. The digital object comprises a plurality of identification attributes associated with an identity of the user in a cyber system and establishes the identity of the user.

Request module 216 receives a request command from one or more data users to access the consent data of the user. The permission of the user indicates a first transaction on a private chain of the blockchain network.

Access module 218 triggers the blockchain network to enable data users to access the consent data In an embodiment, the access module 218 evaluating the request command of the data users based on a plurality of predefined parameters to facilitate the user to access the consent data. In an embodiment, the predefined parameters comprising a due diligence operation performed on the data users and the request command to access the consent data by the data provider in an embodiment, the access module 218 enables the data users to access the consent data of the user after mapping the request with the corresponding user.

Visual module 220 displays the first transaction, and the consent data to the user and the data provider Modification module 222 allows the user to modify the data corresponding to the user by possessing a private key necessary to modify the data. Incentive module 224 triggers a second transaction on a public chain of the blockchain network to provide an incentive. In an embodiment, the incentive module 224 detects the sharing of the consent data over the blockchain network and records a latest transaction involving one or more concerned parties selected from at least one the user, the data provider, and the data user. The blockchain network 108 is implemented by a data exchange platform 300 (shown and explained in conjunction with FIG. 3) to provide insightful data related to the user to the data user.

Figure 3:
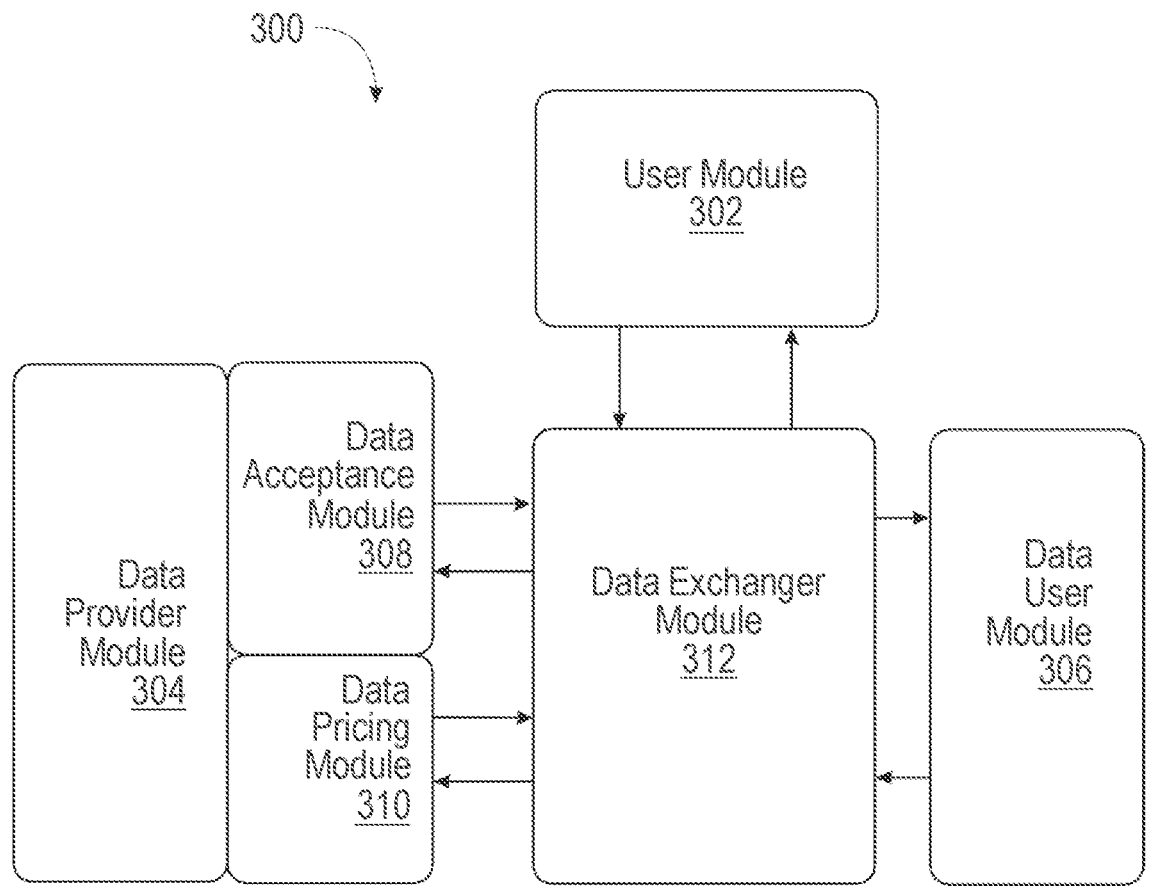
FIG. 3 illustrates a block diagram of the data exchange platform to provide insightful data related to the user to the data user, in accordance with one embodiment of the present invention.

FIG. 3 illustrates a block diagram of the data exchange platform 300 to provide insightful data related to the user to the data user, in accordance with one embodiment of the present invention. The data exchange platform 300 efficiently connect the users, data providers, and data users that may provide the right customer insight to the right retailers at the right time. The data exchange platform 300 enables the users or data owners to monetize their own data and they get incentivized according to the data action performed. The data exchange platform 300 provides the real-time data statistics in a software application such as an IOS app, and an android. The data exchange platform 300 operable to use the blockchain network to ensure the user's security and augments privacy.

The data exchange platform 300 helps the data user to get the right customer data at the right time. The data exchange platform 300 comprises a data provider module 304, a data acceptance module 308, a user module 302, a data pricing module 310, a data user module 306, and a data exchange module 312 in which ail the transactions of consent, data occur via the blockchain network.

The data provider is a party which gathers the information of the user (data owner). These data providers store and provide the data parameters such as name, age, gender, address, date of birth, likes, purchase history, etc. Examples of the data provider may include a bank which has the Address. Name etc. information of the data owner, a human resource provider such as naukri.com which has the information like working status, profile of the data Owner etc. a big data platform such as a Bluekai which has information of Android ID's of the Data Owners mobiles, a telecom partners which has the phone numbers of the data owners.

The users such as a data owner are real customers/persons, who provide the data to the aggregators and by their consent that particular data parameter is fetched from the data aggregators to the present system via the Blockchain network.

The data users or a data requestors are the retailers or a party which requests for the data of the owners/customers. These can choose the data pricing or either the credit-based system for fetching the data Data Requestors will be provided with a Unique ID (Blockchain Transaction Hash) which has the data. These can have their own customization like they can set the rules/Budget of the Data parameters to be fetched from the Instance.

In operation, data provider module 304 enables the data providers to Sign in in the software application, in which they can declare the data parameters. The data provider signs up in the software application, they can enter the data parameters in the software application Once they enter the parameters they are listed as a URL in the software application. This listing of the parameters of data and the data transactions are done via the Blockchain network. The blockchain network can be of Hybrid (Public Blockchain, Private Blockchain, Permissioned Blockchain) according to the usage. These listed data parameters are provided with the Unique Identifier. These particular data parameters and the data, provided by the data aggregators are transmitted to the data exchange module 312.

Data acceptance module 308 identifies all the data parameters provided by the data aggregators to segregate and select the right data which will be useful for data users. Then the selected data parameters are thus listed in the software application. For example, when the data provider sets around 50 data parameters. In this, the data acceptance module 308 selects the top 10 or most useful data parameters that will be listed in the software application.

User module 302 facilitates the users or data owners to register in the software application and on their own consent the data is fetched from the data providers. The incentive is provided through fiat or cryptocurrency to the users who are registered. They are provided with a Crypto/fiat wallet in the software application. Each view of the data, data requests, exchange of the data and the data parameters are notified to the respective users in a panel of the software application.

The data pricing module 310 provides a monetary value or pricing for each of the selected data parameters. The monetary value may be in terms of Fiat-currency or cryptocurrency. The price of each parameter is thus listed in the software application, where this can be bought by the data users by selecting the particular parameters with a credit-based system or event-based approval methods. The data users can view the data parameter, unique identifier, and pricing which is listed in the software application.

Data user module 306 enables the retailers or the data requestors to initiate the request command for the data. The request command for the data is initiated by a Unique ID and the data users will be paying the particular amount for the data parameter. This transaction of data transfer is done by the Blockchain network and whenever the data user requests for the data, this follows up with a notification to the user or the data owner.

Data user registers in the data exchange platform 300 and provides their details. The data user can get the data by Offline or Online mode by requesting to the data exchange platform 300 with the particular Unique Identifier of the data parameter. These request for the data parameters in the list, according to their need. At the very instance of the data request, this sends the notification across the data users and users respectively. Users or data owners will be responding for the notification, whether he or she can accept or deny the request for data exchange to the particular data user. Once the user accepts to transfer the data—then, the data provider exchanged the consented data with the data user.

The complete data exchange Is done with a blockchain protection layer and provided with a unique identifier. The data user can set their own rules, can set budget or can have got the blanket approval methods, event-based approval methods. The data user can also request for the custom pricing of the listed data parameters. The data thus exchanged through this process is consent data which is highly secure and ensures that there cannot be any kind of fraudulent activity happening in the data user side. The data users are not authorized to share the data with any other of third-parties.

In an embodiment, the data exchange platform 300 may be integrated with a sensor platform that receives the user's data through a sensor unit installed in a various retail store in a real-time. The sensor unit may retrieve the user's phone's identification number, in an embodiment, the identification number of the phone is mapped with the users who have given their consent to share the consent data by the data providers such as a telecom operator server. In an embodiment, based on the phone s identification number and relevant data analysis through various algorithms and machine learning modules, the present system may transmit personalized offers to the users present in the retail store.

The data exchange platform 300 facilitates the data user to initiate an incentive through the data user module 306 before or after receiving the consent data or any Identification information related to the user such as name, age, sex, purchase history, likes, etc. The data user module 306 enables the data user to allocate the incentive which is distributed among the users and the data providers. The incentive initiates by the data user module 306 may be in the form of fiat currency (coins, paper notes, etc.).

Figure 4:
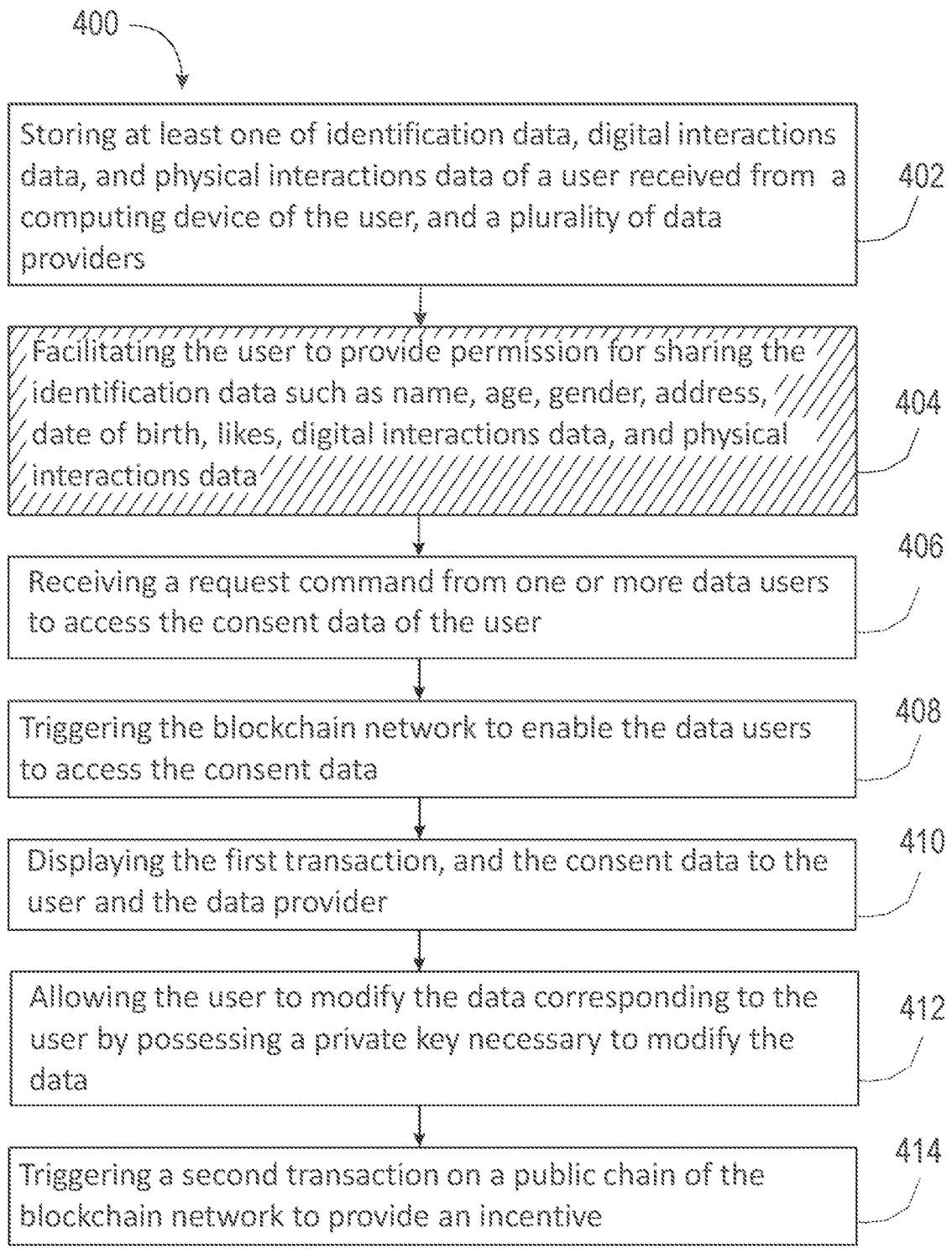
FIG. 4 illustrates a flowchart of the method for managing consent data in a blockchain network, in accordance with an embodiment of the present subject matter.

FIG. 4 illustrates a flowchart 400 of the method for managing consent data in a blockchain network, in accordance with an embodiment of the present subject matter. The method includes the step 402 of storing at least one of identification data, digital interactions data, and physical interactions data of a user received from a computing device of the user, and a plurality of data providers in a storage module configured with the blockchain network. The method then includes the step 404 of facilitating the user to provide permission for sharing the identification data, digital interactions data, and physical interactions data through a consent module. The consent module renders a consent data on receiving the permission of the user and the storage module stores the consent data. The consent data is encrypted and comprises a digital object. The digital object comprises a plurality of identification attributes associated with an identity of the user in a cyber system and establishes the identity of the user. The method includes the step 406 of receiving a request command from one or more data users to access the consent data of the user through a request module. The permission of the user indicates the first transaction on a private chain of the blockchain network.

The method includes the step 408 of triggering the blockchain network to enable the data users to access the consent data through an access module. In an embodiment, the access module evaluating the request command of the data users based on a plurality of predefined parameters to facilitate the user to access the consent data. The predefined parameters comprising a due diligence operation performed on the data users and the request command to access the consent data by the data provider. In an embodiment, the access module enables the data users to access the consent data of the user after mapping the request with the corresponding user.

The method includes step 410 of displaying the first transaction, and the consent data to the user and the data provider through a visual module. The method includes the step 412 of allowing the user to modify the data corresponding to the user by possessing a private key necessary to modify the data through a modification module. The method includes step 414 of triggering a second transaction on a public chain of the blockchain network to provide an incentive through an incentive module. The incentive module detects the sharing of the consent data over the blockchain network and records the latest transaction involving one or more concerned parties selected from at least one the user, the data provider, and the data user.

Thus the present system and method digitize ail the transactions and consent data to preserve authenticity and accuracy and provide greater flexibility for request and evaluation of the consent data. Further, the present system and method Increase transparency and trust with up-to-date transactions and ensures the customer's confidentiality.

While embodiments of the present invention have been illustrated and described, it will be clear that the invention is not limited to these embodiments only. Numerous modifications, changes, variations, substitutions, and equivalents will be apparent to those skilled in the art, without departing from the scope of the invention, as described in the claims.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method for managing consent data in a blockchain network, the method comprising the steps of:
   storing, by a consent data management device, at least one of identification data, digital interactions data, and physical interactions data of a user received from a computing device of the user, and a plurality of data providers in a storage module configured with the blockchain network;
   facilitating, by the consent data management device, the user to provide permission for sharing the at least one of identification data, digital interactions data, and physical interactions data through a consent module, wherein the consent module renders a consent data on receiving the permission of the user and the storage module stores the consent data, wherein the consent data is encrypted and comprises a digital object, wherein the digital object comprises a plurality of identification attributes associated with an identity of the user in a cyber system and establish the identity of the user;
   receiving, by the consent data management device, a request command from one or more data users to access the consent data of the user through a request module, wherein the permission of the user indicates a first transaction on a private chain of the blockchain network;
   triggering, by the consent data management device, the blockchain network to enable the data users to access the consent data through an access module;
   displaying, by the consent data management device, the first transaction, and the consent data to the user and a data provider through a visual module; and
   triggering, by the consent data management device, a second transaction on a public chain of the blockchain network to provide an incentive through an incentive module, wherein the blockchain network is implemented by a data exchange platform to provide data statistics related to the user to the data user, wherein the data exchange platform enables the users to monetize their consent data by receiving the incentive according to the data action performed, wherein the data exchange platform is integrated with a sensor platform that receives the user's data through a sensor unit installed in a retail store, wherein the sensor unit retrieves a phone's identification number of the user.

2. The method of claim 1, further comprising allowing, by the consent data management device, the user to modify the data corresponding to the user by possessing a private key necessary to modify the data through a modification module.

3. The method according to claim 1, wherein the incentive module detects the sharing of the consent data over the blockchain network and records a latest transaction involving one or more concerned parties selected from at least one of the user, the data provider, and the data user.

4. The method according to claim 1, wherein the access module evaluates the request command of the data users based on a plurality of predefined parameters to facilitate the user to access the consent data.

5. The method according to claim 4, wherein the plurality of predefined parameters comprises a due diligence operation performed on the data users and the request command to access the consent data by the data provider.

6. The method according to claim 1, wherein the access module enables the data users to access the consent data of the user after mapping the request command with the corresponding user.

7. A system for managing consent data in a blockchain network, the system comprising:
a processor and
a memory communicatively coupled to the processor, wherein the memory stores instructions executed by the processor, wherein the memory:
stores at least one of identification data, digital interactions data, and physical interactions data of a user received from a computing device of the user, and a plurality of data providers in a storage module;
facilitates the user to provide permission for sharing the at least one of identification data, digital interactions data and physical interactions data through a consent module, wherein the consent module renders a consent data on receiving the permission of the user and the storage module stores the consent data, wherein the consent data is encrypted and comprises a digital object, wherein the digital object comprises a plurality of identification attributes associated with an identity of the user in a cyber system and establish the identity of the user;
receives a request command from one or more data users to access the consent data of the user through a request module, wherein the permission of the user indicates a first transaction on a private chain of the blockchain network;
triggers the blockchain network to enable the data users to access the consent data based on the permission of the user through an access module;
displays the first transaction, and the consent data to the user and the data provider through a visual module; and
triggers a second transaction on a public chain of the blockchain network to provide an incentive through an incentive module, wherein the blockchain network is implemented by a data exchange platform to provide data statistics related to the user to the data user, wherein the data exchange platform enables the users to monetize their consent data by receiving the incentive according to the data action performed, wherein the data exchange platform is integrated with a sensor platform that receives the user's data through a sensor unit installed in a retail store, wherein the sensor unit retrieves a phone's identification number of the user.

8. The system according to claim 7, wherein the memory further allows the user to modify the data corresponding to the user by possessing a private key necessary to modify the data through a modification module.

9. The system according to claim 7, wherein the memory detects the sharing of the consent data over the blockchain network and records a latest transaction involving one or more concerned parties selected from at least one the user, the data provider, and the data user through the incentive module.

10. The system according to claim 7, wherein the memory evaluates the request command of the data users based on a plurality of predefined parameters to facilitate the user to access the consent data through the access module.

11. The system according to claim 10, wherein the predefined parameters comprise a due diligence operation performed on the data users and the request command to access the consent data by the data provider.

12. The system according to claim 7, wherein the memory enables the data users to access the consent data of the user after mapping the request command with the corresponding user through the access module.

* * * * *